US008480884B2

(12) United States Patent
Girondi

(10) Patent No.: US 8,480,884 B2
(45) Date of Patent: Jul. 9, 2013

(54) FUEL FILTER UNIT FOR DIESEL INTERNAL COMBUSTION ENGINES

(75) Inventor: Giorgio Girondi, Mantova (IT)

(73) Assignee: UFI Filters S.p.A., Porto Mantovano (Mantova) (IT)

( * ) Notice: Subject to any disclaimer, the term of this patent is extended or adjusted under 35 U.S.C. 154(b) by 1017 days.

(21) Appl. No.: 11/916,772

(22) PCT Filed: May 26, 2006

(86) PCT No.: PCT/EP2006/005156
§ 371 (c)(1), (2), (4) Date: Dec. 6, 2007

(87) PCT Pub. No.: WO2007/054141
PCT Pub. Date: May 18, 2007

(65) Prior Publication Data

US 2008/0202079 A1 Aug. 28, 2008

(30) Foreign Application Priority Data

Jul. 6, 2005 (IT) .............................. RE2005A0075

(51) Int. Cl.
*B01D 35/143* (2006.01)
*B01D 35/00* (2006.01)

(52) U.S. Cl.
USPC ........................................... 210/90; 55/385.3

(58) Field of Classification Search
USPC .................. 210/90, 167.01, 167.02; 55/385.3
See application file for complete search history.

(56) References Cited

U.S. PATENT DOCUMENTS

| | | | | |
|---|---|---|---|---|
| 4,680,110 | A | 7/1987 | Davis | |
| 4,885,082 | A * | 12/1989 | Cantoni | 210/90 |
| 5,674,381 | A * | 10/1997 | Den Dekker | 210/85 |
| 6,068,762 | A * | 5/2000 | Stone et al. | 210/90 |

FOREIGN PATENT DOCUMENTS

| | | | |
|---|---|---|---|
| EP | 0205411 | A2 | 6/1986 |
| EP | 0 205 411 | A2 | 12/1986 |
| IT | 01294445 | | 3/1999 |
| JP | 54-43804 | A | 3/1982 |
| JP | 59-108859 | A | 6/1984 |
| RE | 97A000046 | | 7/1997 |

OTHER PUBLICATIONS

International Search Report mailed Aug. 18, 2006.

* cited by examiner

*Primary Examiner* — Nam Nguyen
*Assistant Examiner* — Madeline Gonzalez
(74) *Attorney, Agent, or Firm* — Browdy and Neimark, PPLC

(57) ABSTRACT

For diesel internal combustion engines, an improved filter unit comprising a casing the interior of which is separated by a filtering baffle into two separate chambers to which a fuel inlet conduit and a fuel outlet conduit are connected respectively, with said unit there being associated a device for determining the degree of clogging of the filtering baffle; said device is located inside said casing and is positioned to be sensitive to the difference between the fuel pressure in said chambers.

13 Claims, 5 Drawing Sheets

FUEL FILTER UNIT FOR DIESEL INTERNAL COMBUSTION ENGINES

TECHNICAL FIELD

The present invention relates to a filter unit to be associated with diesel internal combustion engines, and in particular to a filter unit provided with a device for determining the degree of clogging of the unit filtering baffle.

PRIOR ART

For the correct operation of internal combustion engines, in particular for diesel engines, the fuel must be filtered before being fed to the engine, in order to remove the impurities contained therein.

The fuel for diesel engines may contain large quantities of impurities, or of more or less solid substances (especially paraffins) which have separated because of relatively low temperature. These impurities and solid substances can quickly clog the filtration means present in the filter unit, to the extent of completely preventing the fuel from reaching the engine.

To overcome this drawback, the same applicant has devised a filter unit provided with a device for determining the clogging of the filtering baffle. This device is described in detail in patent application No. RE97A000046. In particular, said device is sensitive to the difference in fuel pressure between the filter inlet and outlet, this pressure difference being a quantity significantly related to the degree of clogging of the filter. The device is arranged to produce an alarm signal if said pressure difference exceeds a limiting value indicating filter clogging.

The device is associated with a suitable seat provided on the head of the filter unit, and is hence external to the filter casing. The presence of the device on the top of the filter unit increases the overall size of the unit and in particular applications complicates the installation of the unit on the engine, replacement of the device if faulty also being complicated and costly, as the operator has to remove the entire unit from the engine.

In addition to this, the filter head is usually made of metal alloy by casting, and the formation of the conduits and seats for housing the device makes the piece particularly costly.

DISCLOSURE OF THE INVENTION

The object of the present invention is to overcome the drawbacks of the known art within the context of a simple, rational and low-cost solution.

The invention attains said object by virtue of a filter unit presenting the technical characteristics defined in the independent claim 1.

The dependent claims define particular advantageous embodiments of the invention.

BRIEF DESCRIPTION OF THE DRAWINGS

The characteristics and the constructional merits of the invention will be more apparent from the ensuing description given with reference to the figures of the accompanying drawings which illustrate a particular preferred embodiment by way of non-limiting example.

BEST MODE FOR CARRYING OUT THE INVENTION

Figure 1:
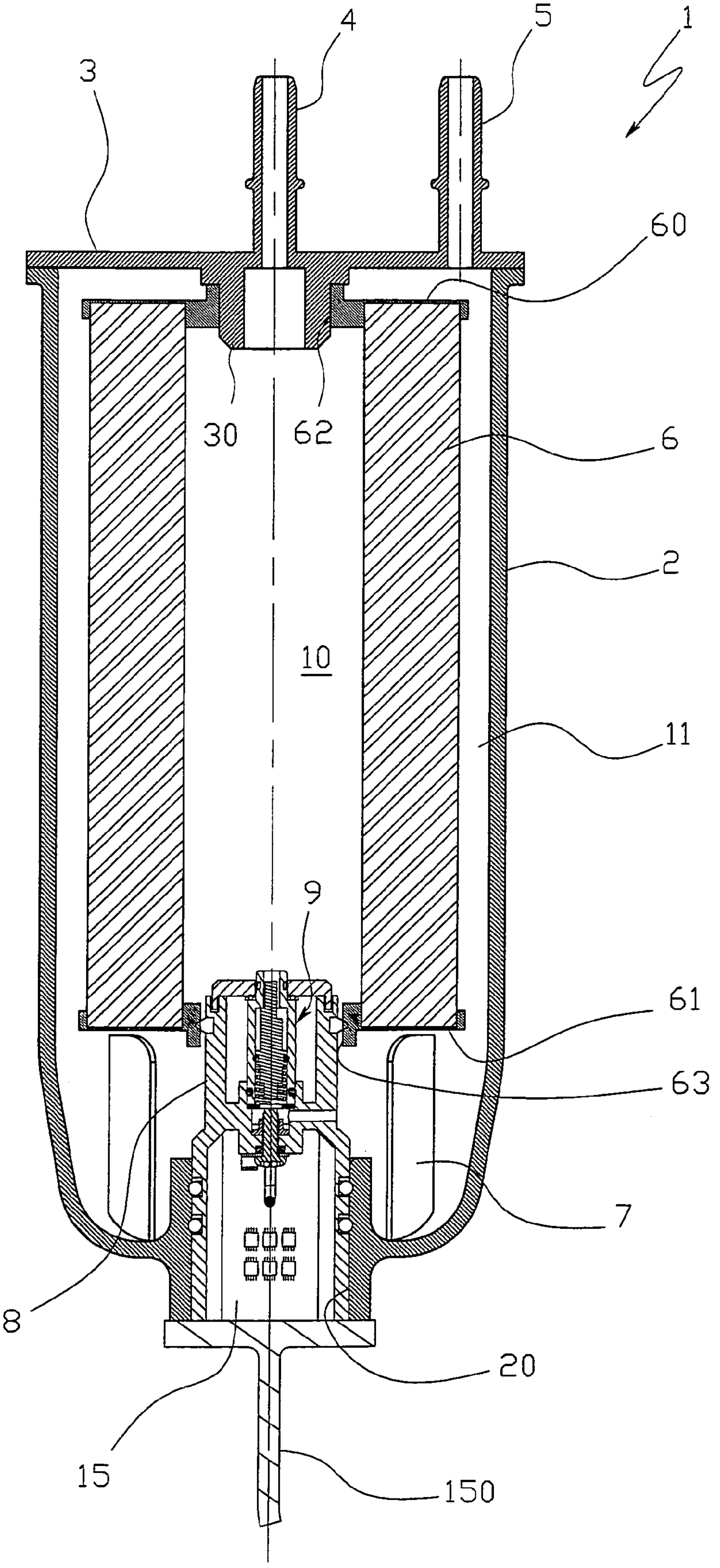
FIG. 1 is a side section through the filter unit of the invention.

Said FIG. 1 shows the filter unit 1, comprising a cup-shaped outer casing 2 closed upperly by a cover 3 on which a fuel inlet conduit 4 and a fuel outlet conduit 5 are positioned.

The interior of the casing 2 houses a toroidal filtering baffle comprising an upper end 60 and a lower end 61, both provided with a central hole indicated respectively by the reference numerals 62 and 63.

The hole 62 of the upper end 60 receives a stem 30 which branches lowerly from the cover 3 at the conduit 4; the lower end 61 rests on a support element comprising a plurality of angularly equidistant fins 7 branching from the lower surface of the casing 2.

The casing 2 lowerly presents a tube shaped hole 20 which receives a support 8 inserted into the hole 63 extending within the baffle 6.

Said support 8 carries in proximity to the hole 63 a device 9 for determining the clogging of the filtering baffle 6.

Said filtering baffle 6 and the device 9 divide the interior of the casing 2 substantially into two separate chambers 10 and 11, of which the first, 10, is connected to the inlet conduit 4 for the fuel to be filtered, and the second, 11, is connected to the outlet conduit 5 for the filtered fuel.

The purpose of the device 9 is to measure the pressure difference arising during operation of the unit 1 between the two chambers 10 and 11, the value of which, as stated, is indicative of the degree of clogging of the filtering baffle 6.

Figure 3:
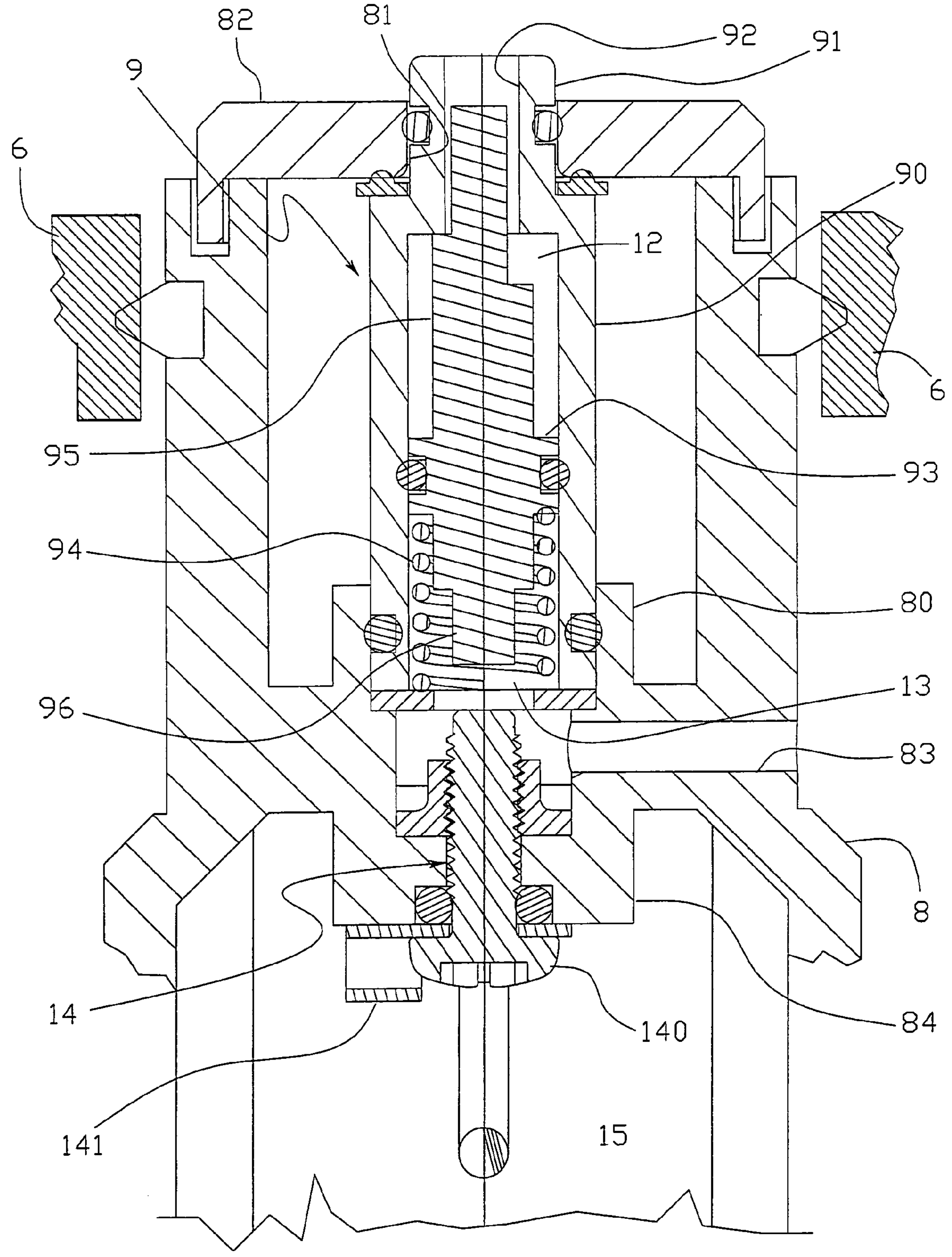
FIG. 3 an enlarged section through a detail of FIG. 2.

With reference to FIG. 3, the device 9 comprises a cup-shaped body 90, from the base of which there branches a stem 91 having a central through hole 92.

The device 9 is carried by the support 8, one end of the body 90 being inserted into a hole in a portion 80 of the support and the opposite end being inserted into a central hole 81 in a cover 82 of the support.

Figure 2:
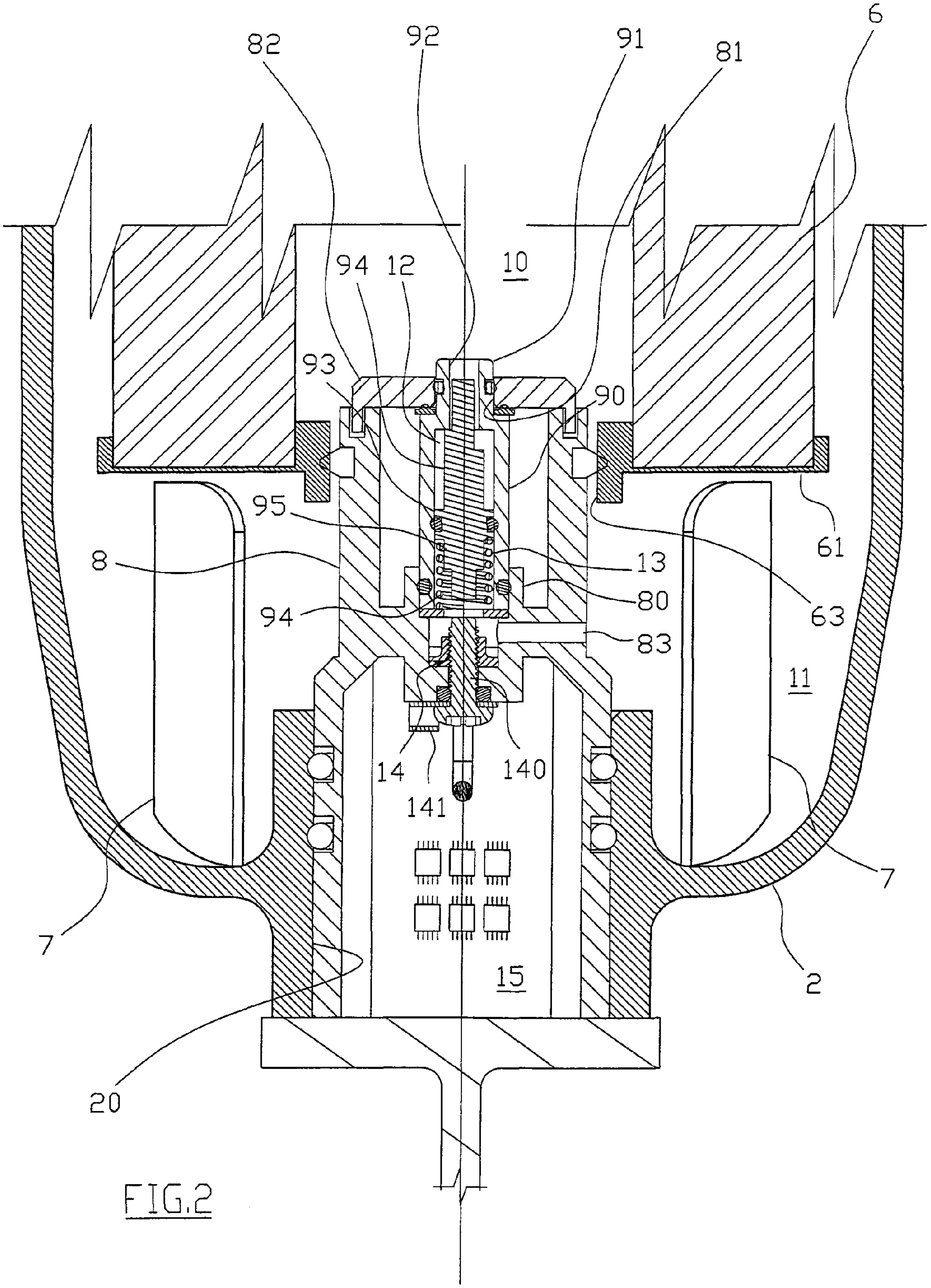
FIG. 2 is an enlarged view of a detail of FIG. 1.

The interior of the cup carries an axially slidable piston 93 which divides the interior of the cup-shaped body 90 into two non-communicating chambers 12 and 13. One end of the chamber 12 communicates with the chamber 10 via the hole 92. The chamber 13 communicates with the chamber 11 via a hole 83 (FIG. 2) present in the support.

Consequently the chamber 13 communicates with the filter outlet conduit 5, while the other chamber 12 communicates with the inlet conduit 4.

Inside the cup-shaped body 90 there is a spring 94 (or an equivalent means for providing an opposing thrust) which acts on the piston 93 to urge it towards the chamber 12 communicating with the inlet conduit 4, against the action of the pressure difference between the two chambers 12 and 13.

Each end of the piston 93 is associated with a shank, indicated by the reference numerals 95 and 96. The free end of the shank 95 is received in the hole 92 of the stem 91, which hence acts as a guide for the piston 93.

On the opposite end of the piston 93 there is fixed a shank 96 arranged to act on a sensor 14, in the form of a metal screw 140.

The screw 140 is screwed through a element 84 of the support 8 and is connected electrically, via an L-shaped flange 141, to an electronic card 15 housed in a widened lower portion of the support 8.

The card 15 is connected by a data transmission cable 150 to the vehicle control system, to which means are connected for emitting an acoustic and/or luminous alarm signal when the shank 96 comes into contact with the screw 140.

In practice the electronic card 15 maintains the screw 140 at a determined voltage V and measures the voltage variation which occurs when the shank 96 comes into contact with the screw 140, against the action of the spring 94.

When in use, the piston 93 is subjected to the fuel pressure difference ΔP between the inlet (in particular the inlet conduit 4) and the outlet (in particular the outlet conduit 5).

As the fuel flow undergoes pressure drop in passing through the filtering baffle 6, the pressure is less at the outlet and hence the action of the pressure difference ΔP on the piston 93 urges it towards the end of the chamber 13 communicating with the outlet conduit 5, against the action of the spring 94.

The present invention is based on the fact that there exists a strict relationship between the pressure difference ΔP and the degree of clogging of the filtering baffle 6, in the sense that as the degree of clogging of the baffle increases with use (due to dirt, impurities and other solid or semisolid material separated from the fuel), the pressure drop through the flow increases at the filter outlet, i.e. the pressure difference ΔP increases with a consequent increase in the thrust on the piston 93 opposing the thrust of the spring 94.

The position of the device 9 within the casing 2 means that the overall size of the filter unit 1 can be reduced. It should be noted that in other embodiments of the invention, the device 90 can be shaped so as not to require a support element such as that described. It could for example be directly fixed to the hole 63 in the lower end 61 of the filtering baffle 6, by simply varying the hole diameter appropriately and securing the device 9 to the lower end by known fixing means.

Figure 4:
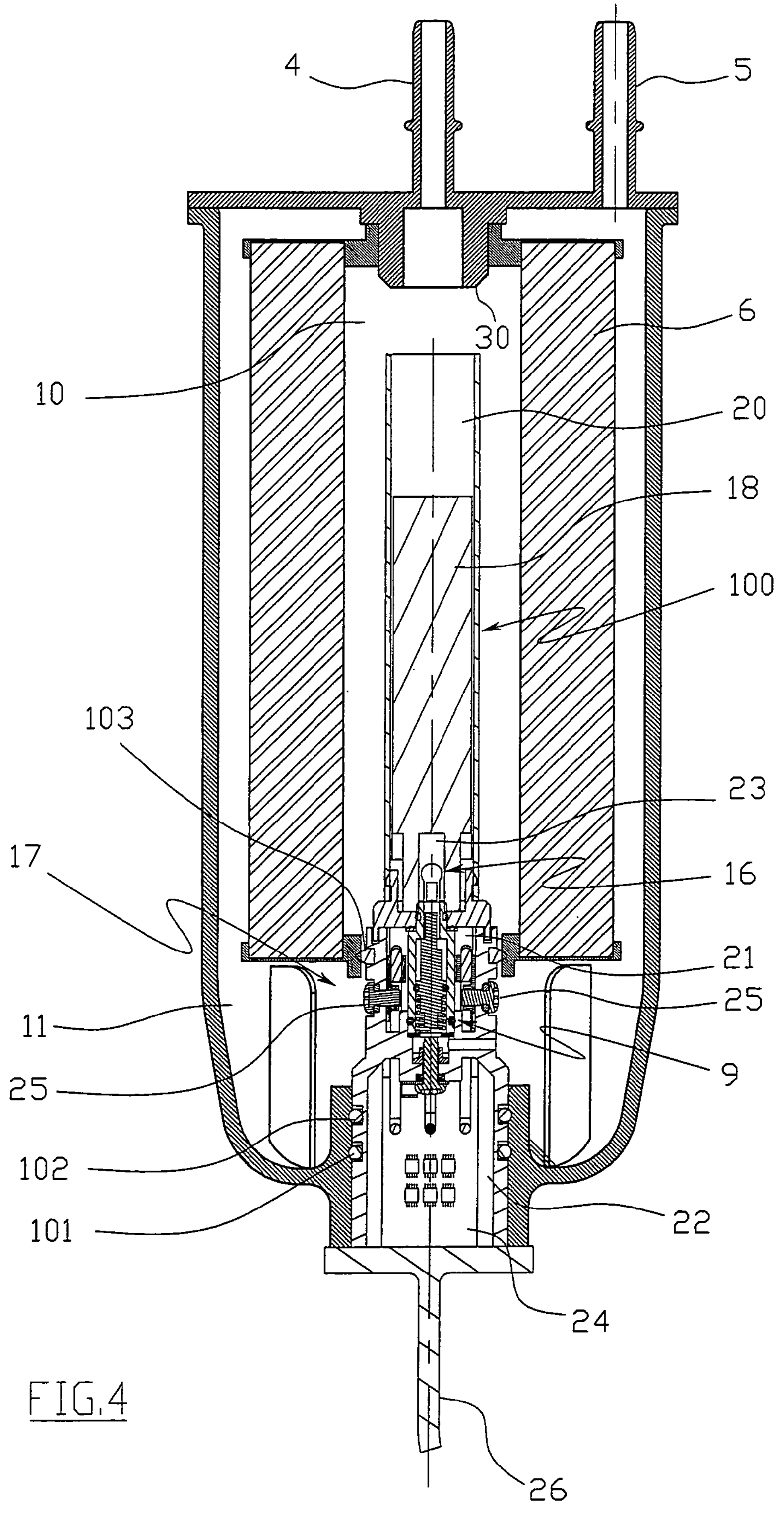
FIG. 4 is a side sectional view of a modified embodiment of the filter unit of the invention.
Figure 5:
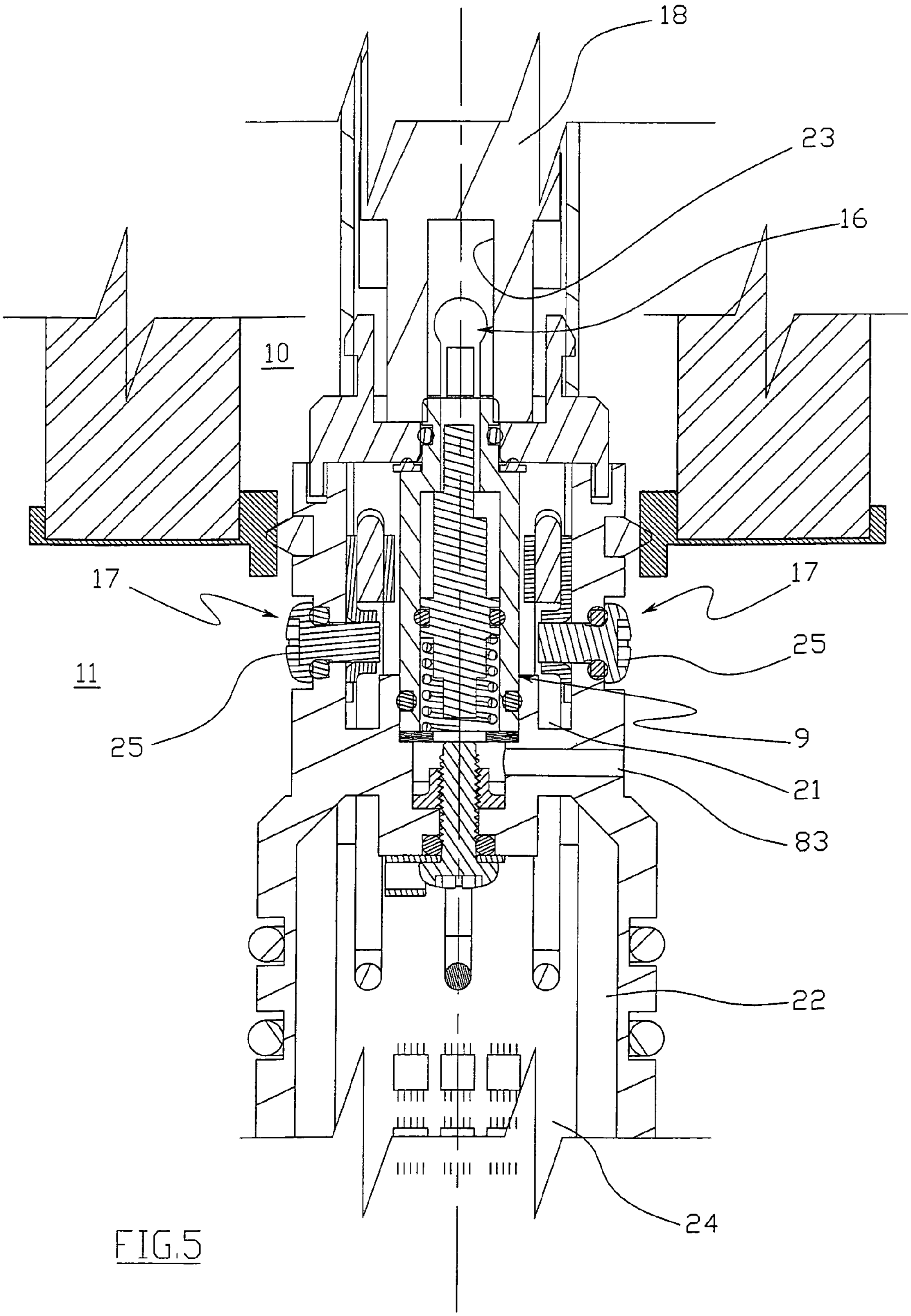
FIG. 5 is an enlarged view of a detail of FIG. 4.

FIGS. 4 and 5 show a variant of the invention which differs from the aforedescribed embodiment in that the support element for the device 9 also acts as the support for a plurality of different sensors, each of which is provided for measuring a like number of engine operating parameters.

The figures show a support 100 which in addition to the device 9 also carries a sensor 16 to measure the fuel temperature, a sensor 17 for measuring the quantity of water collected on the bottom of the casing 2, and a heater device 18 to be activated to melt the paraffins which form in the fuel at low temperature.

The support 100 is externally shaped as a shaft of differing cross-section which is sealedly inserted, via gaskets 101, 102 and 103, into the casing 2 and into the filtering baffle 6, and extends until close to the stem 30. Together with the filtering baffle 6, said support 100 hence defines said chambers 10 and 11.

The supports 8 and 100 are rigidly fixed to the casing 2 by a usual fixing means, not shown, such as a peg or setscrew.

Internally the support 100 is hollow and is divided into three separate portions, of which an upper portion 20 lies within the chamber 10, a central portion 21 lies between the chamber 10 and the chamber 11, and an underlying lower portion 22 lies within the chamber 11.

The upper portion 21 is upperly open, being in the form of a cup-shaped body and presents in its lateral surface two rectangular apertures 23.

The sensor 16 for measuring the fuel temperature is located in the portion 21 in proximity to said apertures 23, said sensor being connected to an electronic control card 24 housed within the lower portion 22 of the device.

The upper portion 21 also internally houses the heater device 18, of known type, also connected to said electronic control card 24.

As already stated, the support 100 also comprises the sensor 17 for determining the presence of an excessive water quantity which accumulates on the bottom of the casing 2. In the illustrated embodiment said sensor comprises two inductive electrodes 25, electrically connected to said control card 24.

Each of said inductive electrodes 25 is in the form of a screw, the head of which projects from the outer surface of the support 100.

The control card 24 is connected by a data transmission cable 26 to the vehicle control system.

The positioning of all sensors within the support 100 enables the filter to be easily and quickly replaced. To do this, the operator first removes the fixing means, not shown, then simply withdraws the support from the casing 2 and reinserts it into the casing 2 of the new filter unit.

It should also be noted that the shaft-like construction of the support has the further advantage of not having sensors comprising disposable components as in the known art, this considerably reducing the overall cost of the filter unit.

Finally, in other embodiments the support 100 can comprise sensors which differ in terms of number and/or function from those already described.

The invention claimed is:

1. For diesel internal combustion engines, an improved filter unit comprising a cup shaped outer casing (2) closed on an upper end by a cover (3) on which a fuel inlet conduit (4) and a fuel outlet conduit (5) are positioned, the interior of the casing (2) being separated by a toroidal filtering baffle (6) into a first and a second separated chambers (10, 11) to which the fuel inlet conduit (4) and the fuel outlet conduit (5) are connected respectively, the lower end (61) of the filtering baffle (6) being supported by a lower surface of the casing (2);

a device (9) associated with said filter unit for determining the degree of clogging of the filtering baffle (6);

a tube shaped hole (20) defined in said lower surface of said casing (2), an outer circumference of the filtering baffle being larger than the tube shaped hole;

a support element (8,100) sealingly received in said tube shaped hole and inserted into an axial hole (63) extending within the filtering baffle (6) to which the support element (8, 100) is sealingly connected, and wherein said device (9) for determining the degree of clogging of the filtering baffle (6) is sensitive to the difference between the fuel pressure in said first and second chambers (10, 11), is located inside said support element (8, 100), wherein the support element together with the device (9) for determining the degree of clogging is removable from the bottom of the casing (2) through the tube shaped hole, wherein said device (9) comprises a cup-shaped body (90), from a base of which there branches a stem (91) having a central through hole (92), wherein the stem (91) is inserted into a central hole (81) in a cover (82) of the support element (8, 100) and the opposite end of the cup-shaped body (90) is inserted into a hole in a portion (80) of the support element (8, 100), and wherein the cup-shaped body (90) accommodates an axially slidable piston (93), which divides the interior of the cup shaped body (90) into two non-communicating chambers (12, 13), including a third chamber (12) communicating with the first chamber (10) via the hole (92) of the stem (91) and a fourth chamber (13) communicating with the second chamber (11) via an additional hole (83) present in the support element (8, 100).

2. A unit as claimed in claim 1, wherein said filtering baffle (6) comprises an upper end (60) and a lower end (61), said ends being provided with a central hole (62, 63).

3. A unit as claimed in claim 2, wherein said device (9) is inserted through said central hole (63) in said lower end (61).

4. A unit as claimed in claim 1, wherein said support element (8, 100) is partially inserted into said casing through said tube shaped hole (20) of the casing (2).

5. A unit as claimed in claim 1, wherein said support (100) provided with sensors (16,17) for measuring certain characteristic parameters for correct engine operation.

6. A unit as claimed in claim 5, wherein said sensors comprise at least one sensor (17) for measuring the water which collects in the bottom of the casing (2) during filtration, a temperature measurement sensor (16) and a heater device (18).

7. A unit as claimed in claim 5, wherein a seal gasket is interposed between said support (100) and the lower end of said filtering baffle.

8. A unit as claimed in wherein 5, wherein said support (100) is externally shaped as a shaft with differing cross-sections.

9. A unit as claimed in claim 5, wherein said support (8, 100) houses a control card (24) for the sensors (16, 17) associated with said device (9).

10. A unit as claimed in claim 1, wherein said device (9) is removably associated with the casing (2) by fixing means.

11. A unit as claimed in claim 1, wherein said support element (8) houses an electronic card (15) for a sensor (14) associated with said device (9).

12. A unit as claimed in claim 1, wherein the cup-shaped body (90) comprises means (94) which act on the piston (83) to urge it towards the third chamber (12).

13. A unit as claimed in claim 1, wherein each end of the piston (93) is associated with a shank (95, 96), including a first shank (95), a free end of which is received in the hole (92) of the stem (91), and a second shank (96) arranged to act on a sensor (14).

* * * * *